US008212915B1

(12) United States Patent
Clark et al.

(10) Patent No.: US 8,212,915 B1
(45) Date of Patent: Jul. 3, 2012

(54) EXTERNALLY ACTUABLE PHOTO-EYEPIECE RELAY LENS SYSTEM FOR FOCUS AND PHOTOMONTAGE IN A WIDE-FIELD IMAGING SYSTEM

(76) Inventors: Lloyd Douglas Clark, San Francisco, CA (US); Brian A. Brown, San Francisco, CA (US); William T. Davids, Palo Alto, CA (US)

( * ) Notice: Subject to any disclaimer, the term of this patent is extended or adjusted under 35 U.S.C. 154(b) by 114 days.

(21) Appl. No.: 12/853,406

(22) Filed: Aug. 10, 2010

Related U.S. Application Data

(63) Continuation-in-part of application No. 12/748,412, filed on Mar. 27, 2010.

(60) Provisional application No. 61/356,012, filed on Jun. 17, 2010.

(51) Int. Cl.
  G03B 13/00 (2006.01)
  G02B 13/16 (2006.01)
  G02B 1/06 (2006.01)

(52) U.S. Cl. ......... 348/345; 348/335; 359/665; 359/666

(58) Field of Classification Search .......... 359/665, 359/666; 348/335, 345
  See application file for complete search history.

(56) References Cited

U.S. PATENT DOCUMENTS

| 4,466,703 | A  |   | 8/1984  | Nishimoto |        |
|-----------|----|---|---------|-----------|--------|
| 4,572,616 | A  |   | 2/1986  | Kowel et al. |     |
| 5,212,583 | A  |   | 5/1993  | Vali et al. |       |
| 6,747,806 | B2 |   | 6/2004  | Gelbart   |        |
| 6,778,246 | B2 |   | 8/2004  | Sun et al. |        |
| 7,002,737 | B1 | * | 2/2006  | Akiyama et al. | 359/368 |
| 7,191,372 | B1 | * | 3/2007  | Jacobson et al. | 714/724 |
| 7,256,943 | B1 |   | 8/2007  | Kobrin et al. |     |
| 7,564,386 | B2 | * | 7/2009  | Barford   | 341/120 |
| 7,672,059 | B2 |   | 3/2010  | Batchko et al. |   |
| 7,675,686 | B2 |   | 3/2010  | Lo et al. |        |
| 2005/0270639 | A1 | * | 12/2005 | Miki   | 359/381 |
| 2006/0039603 | A1 | * | 2/2006  | Koutsky | 382/165 |
| 2009/0052049 | A1 | * | 2/2009  | Batchko et al. | 359/666 |

OTHER PUBLICATIONS

H. Oku et al., High-speed liquid lens with 2 ms response and 80.3 nm root-mean-square wavefront error, Journal, 2009, 221108-1 to 221108-3, vol. 94, Applied Physics Letters, US.
Physikinstrumente GMBH & Co., www.physikinstrumente.com/en/products/primages.php?sortnr=200375&picview=2#gallery.

* cited by examiner

*Primary Examiner* — Sinh Tran
*Assistant Examiner* — Mark Monk

(57) ABSTRACT

A relay lens assembly (100) for use with a microscope (1400), telescope or binocular (1500), comprises a lens element (300) that is responsive to commands, conveyed from a control unit (400), via a conduit (410) between the control unit and the lens element. A computing device (810) controls operation of the lens assembly and a digital camera (805) that has an image sensor (125). The control unit causes the lens assembly to assume any of a plurality of predetermined focal lengths so that different depths of an object being imaged can be rendered in-focus on the sensor. A series of images can be taken at predetermined, computer-controlled focal depths. These images can be processed in order to create a photomontage that is in focus at a plurality of predetermined depths in a process commonly called focus-stacking. The addition of a plurality of data input and analysis units (1105) and a combiner (1115) makes rapid processing of individual images possible for photomontage at video rates.

20 Claims, 8 Drawing Sheets

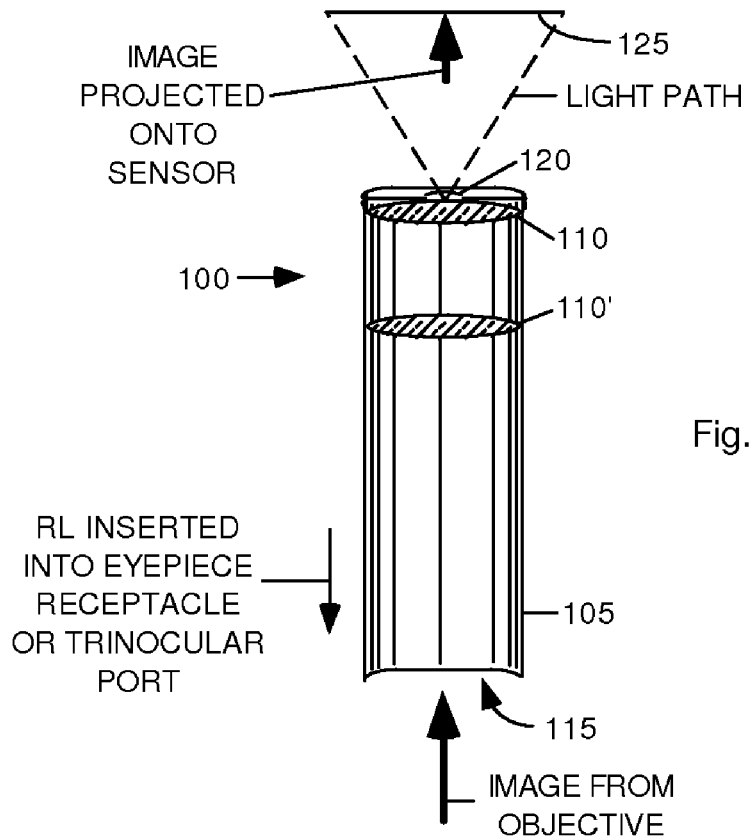
Fig. 1--PRIOR ART
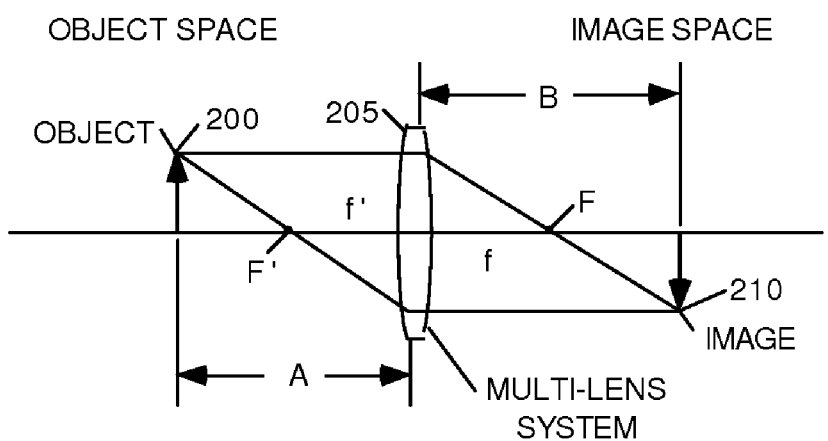
Fig. 2--PRIOR ART

EXTERNALLY ACTUABLE PHOTO-EYEPIECE RELAY LENS SYSTEM FOR FOCUS AND PHOTOMONTAGE IN A WIDE-FIELD IMAGING SYSTEM

CROSS REFERENCE TO PENDING APPLICATIONS

The present application claims priority of our provisional patent application Ser. No. 61/356,012, filed Jun. 17, 2010, and is a continuation continuation-in-part of our copending application Ser. No. 12/748,412, filed 2010 Mar. 27, which is incorporated by reference in its entirety.

BACKGROUND

Prior Art—Movable Objective Lens for Use with Microscopes

Physikinstrumente GMBH & Co. of Karlsruhe, Germany sell a movable objective lens assembly for use with microscopes. Their model P-725 scanner uses a piezoelectric element and associated drive electronics to move a microscope objective in the axial direction, thereby moving the focus nearer to or farther from a datum position. The response time for a 250 micron step is 50 ms with a 150 g load.

The axial motion response time of this apparatus is sufficient for some of the lower-speed applications described herein, however the mounting requirements of the assembly interfere with easy changing of the microscope objective during use. In addition, the scanner is limited to use with microscope objectives only.

Prior Art—Lenses with Variable Focal Length

Lenses with controllable focal length are used in the various embodiments described below. These lenses are well known to those skilled in the art of optics. A few of the types are listed here as examples of lenses that can be used. This list is not exhaustive.

In U.S. Pat. No. 4,466,703 (1984), Nishimoto teaches a variable focal length using an electro-optic effect. Another electro-optical lens is taught by Vali et al. in U.S. Pat. No. 5,212,583 (1993). Both apply distributions of electrical potentials to electro-optical materials in order to vary the focal length of a lens assembly.

In U.S. Pat. No. 4,572,616 (1986), Kowel et al. show a liquid-crystal adaptive lens system in which the index of refraction profile of a liquid crystal assembly varies the focal length of the lens. Sun et al. show another liquid crystal adaptive (variable focus) lens in U.S. Pat. No. 6,778,246 (2004) also using electrical potential to change the refraction profile of the liquid crystal.

Gelbart, in U.S. Pat. No. 6,747,806 (2004), shows an adaptive microlens. Individual elements in a micro-electromechanical system (MEMS) array of integrated stretched membrane devices are independently addressed and controlled to vary focal length.

In U.S. Pat. No. 7,675,686 (2010), Lo et al. show a fluidic adaptive lens. A flexible diaphragm separates two transparent chambers. When the diaphragm is caused to flex by changing the properties of fluids within the chambers, the focal length of the lens changes. Another fluidic variable lens is shown by Kobrin et al. in U.S. Pat. No. 7,256,943 (2007). In this patent, a fluid is contained in an elastomer membrane. A pneumatic actuator displaces the fluid and causes the shape of the membrane to change, thereby changing the focal length of the lens.

U.S. Pat. No. 7,672,059 (2010) to Batchko et al. teaches a fluidic lens with electrostatic actuation. The lens comprises an elastic capacitor section, an elastic lens section in fluid communication with the capacitor section, and a fluid capable of motion between the two. Applying a voltage to the capacitor section causes it to deform, urging the fluid to flow into or out of the lens section, causing the lens section to deform, thereby changing the focal length of the lens section.

Another fluidic lens is described in a paper by Oku and Ishikawa in Applied Physics Letters, V. 94, pages 221108-1 to 221108-3 (2009). Two separate chambers are joined by an orifice. A first fluid having a first index of refraction fills a lower chamber, a second fluid, immiscible with the first and having a different index of refraction from the first, fills an upper chamber. A piezoelectric actuator squeezes the first chamber, causing the interface between the two fluids to bulge by a predetermined amount. Since the two fluids have different indices of refraction, a lens with controllable curvature is formed in the orifice. This lens can change from one focal length to another in the order of one millisecond.

Because of their potential for high speed, one or more of such lenses is used either alone or in combination with additional lenses in the embodiments described below. If high speed is not required, the same lenses can still be used or a zoom relay lens can be fitted with a servomotor and used in place of the above lenses.

Prior Art—FIG. 1

In microscopy and telescopy, it is often desirable to record an image for later use. Thus many microscopes and telescopes are arranged to accept photographic cameras. Digital cameras for these instruments are in wide use today. Cameras can receive an image through an eyepiece port (i.e. the tube in which the eyepiece is mounted), or through a separate "trinocular tube" or port, frequently found on microscopes.

If a camera has an integral lens, an adapter is used to mount the camera on the microscope or telescope's eyepiece or its trinocular tube. Such adapters are well known to those skilled in the art of optics. These will not be discussed further here.

If the camera has no lens, a separate relay lens (RL), also called a photo-eyepiece, is used to optically couple the microscope, monocular or binocular, or telescope with the camera so that the image from the microscope, monocular or binocular, or telescope is in focus on the film or sensor plane of the camera. Many prior-art RLs are available. They have differing arrangements of internal lens elements and different optical properties such as magnification, size, optimal wavelength range, materials of manufacture and the like. RLs are well known to those skilled in the art of optics. (Hereinafter when reference is made to microscopes, monoculars, binoculars, and telescopes collectively, the term "scope" will be used.)

FIG. 1 shows a simplified, cross-sectional view of a typical RL, generally at 100. RL 100 comprises a cylindrical tube 105, one or more lenses 110 secured within tube 105 at various predetermined locations, an entrance 115, and an exit 120. Tube 105 is typically metal and roughly 25 mm in diameter, although other materials and sizes are commonly found. Many different shapes and sizes are available to fit various scope configurations. Although simple meniscus lenses are shown, most prior-art RL assemblies are more complex and may include lenses of many kinds: doublets, triplets, and so forth.

In one prior-art, wide-field imaging system, light from a scope objective (not shown) enters tube 105 at entrance 115, its optical path is modified by one or more of lenses 110, and it leaves tube 105 through exit 120. A photosensor 125 is positioned to receive the light leaving RL 100. Sensor 125 can be a line-scan sensor or an area device using CCD, CMOS, Foveon (the brand name of a particular type of sensor made by the Foveon Corporation of San Jose, Calif., USA), or any other suitable imaging technology. The size of photosensor 125 can range from 1 mm square to over 50 mm square, and can include from a few to many million pixels (picture elements). The distance from RL 100 to sensor 125 ranges from a few mm to distances greater than 20 cm.

RL 100 can be inserted in place of a scope's eyepiece, or it can be inserted into the trinocular tube of a microscope that is so-equipped.

The magnification of RL 100 and the distance between RL 100 and sensor 125 are generally predetermined so that the image from the scope's objective (not shown) fills the full area of sensor 125. In addition, when RL 100 is inserted into the trinocular port of a microscope, it is moved up or down so that the image projected onto sensor 125 is in focus when the user's view through the microscope's eyepieces is in focus. When the image as seen by both is in focus, RL 100 is secured in place with a set screw or other arrangement.

Although the prior art trinocular mounting of RL 100 is used successfully, it is not easily changed while the microscope is in use. Thus all focusing of the microscopic image on sensor 125 is done by raising and lowering the microscope's stage, or otherwise varying the distance between the objective lens and the object being viewed. In addition, microscope objectives have a very limited depth of field. Thus, in many cases, while inspecting an object the microscopist must frequently adjust the focus to see at all depths of the object.

Modern microscopy benefits greatly from the use of well-known focus stacking montage, i.e., the taking of a plurality of images at different focal distances, followed by mathematical processing and combining of the images to produce an image with an extended depth of field. This is useful when viewing subjects whose visible features lie at various depths greater than the depth of field of the objective lens in use, and also objects that are tilted or have irregular surfaces. At present, focus stacking requires the manual or semi-automatic taking of images. A first image is taken with the camera, then the focus is adjusted to present a new focal plane for taking a second image, and so forth until the entire stack is complete. This procedure takes time and requires the operator to touch the microscope, which can result in blurring of the image from motion artifacts and the like.

Binoculars and telescopes must also be adjusted to focus on near or far objects. Thus the images they gather can also benefit from focus stacking. Focusing is normally done by moving the eyepiece in an axial direction by using a rack and pinion or other arrangement. As in the case of microscopes, blurring of the image can result when refocusing for a series of images.

SUMMARY

We have discovered a new and different way to vary the focus at the image sensor for use with focus stacking and also for general scope use. A RL incorporates a variable focus lens (VFL). The focal length of this lens is preferably remotely actuable electrically or by fluidics or other arrangement from outside the RL tube. In normal usage without focus stacking, the focal length of the VFL is left at a constant value. When focus stacking is used, the VFL is energized and the focus stacking apparatus described in detail in our previous application (referenced above) is connected to the VFL in place of or in addition to the on-camera lens, and used with a scope to present a real-time or near-real-time image on a monitor screen. This focus-stacked image will be in focus at all depths selected by the user, within the focal length limitations of the VFL. Thus in microscopy, the user can move a specimen under the objective lens and even though the specimen has an uneven surface or is not always at a constant distance from the objective lens, such as with a swimming specimen, it will be in focus on the monitor because of the use of focus stacking. In telescopy, near and far objects can be in focus in the final image, again within the limitations of the VFL.

DRAWING FIGURES

FIG. 1 shows a prior-art relay lens assembly.

FIG. 2 shows a prior-art ray diagram for a lens or lens system.

Figure 3:
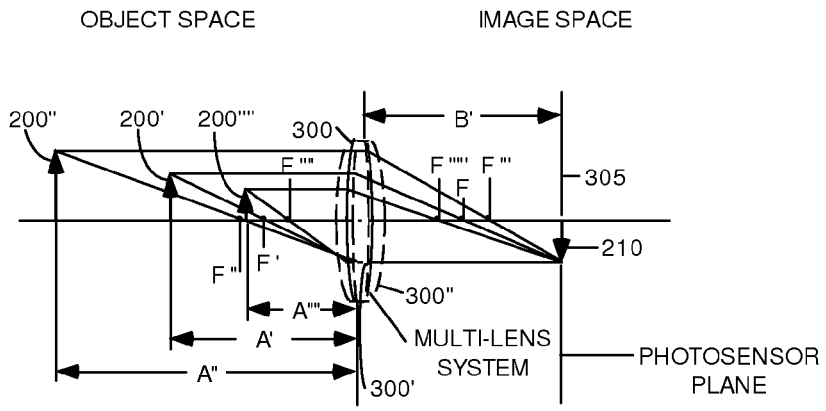
FIG. 3 shows the ray diagram of FIG. 2 as adapted for use with one preferred embodiment.

| DRAWING FIGURE REFERENCE NUMERALS | |
|---|---|
| 100 | Relay lens |
| 105 | Tube |
| 110 | Lens |
| 115 | Entrance |
| 120 | Exit |
| 125 | Photosensor |
| 200 | Object |
| 205 | Lens |
| 210 | Image |
| 300 | Lens |
| 305 | Plane |
| 400 | Control unit |
| 410 | Conduit |
| 700 | Objective lens |
| 800 | Microscope, Telescope, Monocular, Binoculars |
| 805 | Camera |
| 810 | Computer |
| 812 | Conduit |
| 813 | Conduit |
| 814 | Conduit |
| 815 | Monitor |
| 900-945 | Steps |
| 1000-1060 | Steps |
| 1100 | Storage device |
| 1105 | Data input and analysis unit |
| 1106 | Input memory |
| 1107 | Image layer processor |
| 1108 | Firmware |
| 1110 | Output memory |
| 1115 | Combiner |
| 1300-1338 | Blocks |
| 1400 | Microscope |
| 1405 | Trinocular port |
| 1410 | Eyepiece port |
| 1415 | Housing |
| 1420 | Bracket and clamp |
| 1500 | Telescope, binocular |
| 1505 | Housing |
| 1510 | Sensor mount |

PREFERRED EMBODIMENT

Description—FIGS. 2 through 8

FIG. 2 shows a simplified ray diagram of a prior-art multi-lens system. This kind of diagram is well known to those skilled in the field of optics. An object 200 to be viewed is positioned in front of a lens system, represented by lens 205. Lens 205 is shown as a single lens for simplicity, although it can have any number of elements. The diagram is divided into two spaces. An object space to the left of the lens contains the object to be viewed. An image space to the right of the lens contains an image 210 that is produced when light from the object is focused on the image side of lens 205.

Lens 205 has a first focal point F' on the object side, located a distance f' from the object side principal surface (a plane just inside the lens), and a second focal point F, located a distance f from the image side principal surface (a plane just inside the lens) on the image side.

Lens with Changeable Focal Length—FIG. 3

FIG. 3 shows the ray diagram of FIG. 2 as it is adapted to show a variable focal length lens element used in the present embodiment. A variable focal length lens 300 is used. In this case, the shape of lens 300 is changeable according to any of the known methods mentioned above, such as piezoelectric, electric, pneumatic, fluidic, electro-optic, mechanical, and MEMS actuations or their equivalents. One or both focal distances of lens 300 can be changed by altering the curvature of one or both sides of lens 300. In the present example, lens 300 is made thicker or thinner, thus changing the curvature of both surfaces.

Light from an object 200 is focused by lens 300 onto a plane 305 that contains a photosensor 125, such as film or a digital sensor such as a CCD, CMOS, Foveon device, etc., of a camera. In the present embodiment, the distance B' from lens 300 to sensor plane 305 remains constant.

In a smaller size condition, lens 300' has focal points F'' and F'''. In this case, object 200'' at a distance A'' from lens 300' is in focus on plane 305.

In an intermediate size condition with more curvature, lens 300 has focal points F' and F and projects an in-focus image of object 200' at a distance A' from lens 300 onto plane 305.

In a larger size condition with still more curvature, lens 300'' has focal points F'''' and F''''' and projects an in-focus image of object 200 at a distance A'''' onto plane 305.

Thus it is seen that by keeping the distance from lens 300 to plane 305 constant and varying the focal length of lens 300, objects at different distances from lens 300 are brought into focus on plane 305.

Figures 4, 5, 6:
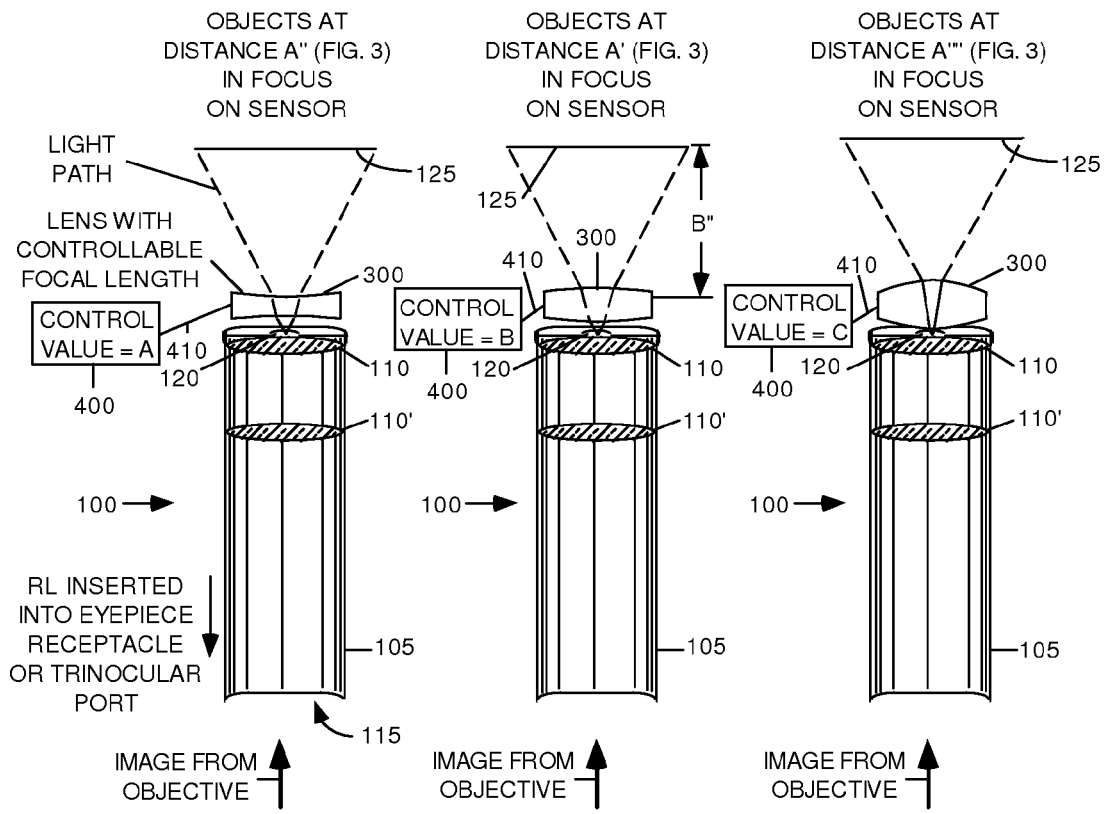
FIGS. 4 through 6 show placement and operation of a variable-focus lens according to the preferred embodiment.

FIGS. 4 to 6—Relay Tube with Variable Focal Length Lens

Figure 7:
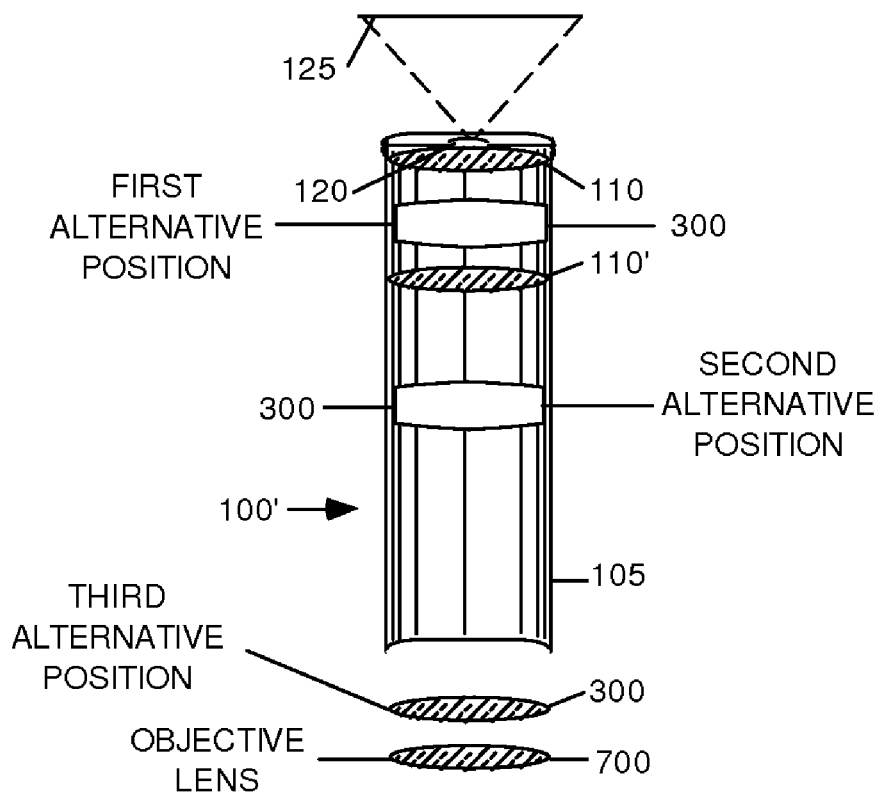
FIG. 7 shows alternative placements of the lens in FIGS. 4 through 6.

FIGS. 4 through 6 show a sectional view of one aspect of the present embodiment. RL 100 has been modified by adding an external lens 300. Although lens 300 is shown on or above the top of RL 100, it can lie at another location on the axis of RL 100 between RL100 as shown in FIG. 7. Lens 300 is a variable focus lens. A control unit 400 communicates with lens 300 by passing commands to lens 300 via a conduit 410. Conduit 410 can be an electrical, mechanical, fluidic, thermal, optical, or any other driving force deliverable from control unit 400 to lens 300 that permits unit 400 to adjust the shape and therefore the focal length of lens 300. Lens 300 can be secured at the position shown in FIGS. 4-6 by a clamping arrangement (not shown) or within an extension of tube 105 (not shown), if desired.

FIG. 4 shows lens 300 actuated to a first focal length by control unit 400. In this case, lens 300 in combination with RL 100 has a longer effective focal length so that objects at a distance A'' (FIG. 3) are in focus on sensor 125.

FIG. 5 shows lens 300 actuated to a second focal length by control unit 400. In this case, lens 300 in combination with RL 100 has an intermediate effective focal length so that objects at distance A' (FIG. 3) are in focus on sensor 125.

FIG. 6 shows lens 300 actuated to a third focal length by control unit 400. In this case, lens 300 in combination with RL 100 has a shorter effective focal length so that objects at distance A'''' (FIG. 3) are in focus on sensor 125.

FIG. 7—Alternative Placements of Lens 300

FIG. 7 shows an alternative aspect of the present embodiment. While FIGS. 4 through 6 show lens 300 located outside RL 100 between RL100 and sensor 125, lens 300 can also be located at the first or second alternative positions shown inside RL 100', among its prior-art optics. Alternatively, lens 300 can be secured outside tube 105 at a third alternative position between RL 100 and an objective lens 700 within a scope. Additionally, more than one of lenses 300 can be used in combination with one-another and with the optical components within RL 100, if desired.

Figure 8:
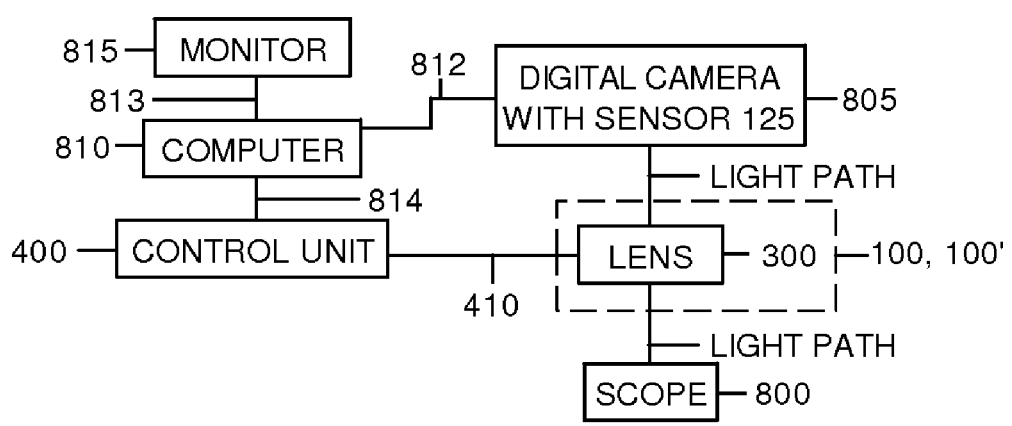
FIG. 8 shows a block diagram of a system according to one aspect of the preferred embodiment.

FIG. 8—Block Diagram

FIG. 8 shows a block diagram of a system according to one aspect of the present embodiment. Lens 300 is incorporated into a scope 800 where it is securely located, either alone or in conjunction with RL 100 or RL 100', in any of the above-described positions (FIGS. 4-7). Lens 300 comprises any of the above-mentioned types: electro-optical, fluidic, liquid crystal, MEMS, and can also include lenses of other types such as those with manual or servomechanically-adjustable focus such as are found on prior-art cameras with integral lenses, lenses that are thermally, pneumatically, or piezoelectrically activated. All lens types that provide variable focus actuable by external command are contemplated for use in this and the alternative embodiments.

A digital camera 805 incorporating sensor 125 (FIGS. 4-6) is positioned to receive an image from lens 300, as described above. Camera 805 operates under instructions from a computer 810 that are conveyed by a two-way conduit 812. Conduit 812 passes operating instructions from computer 810 to camera 805 and receives image information recorded by sensor 125 in camera 805 for storage, analysis, and recording by computer 810. The image information received from camera 805 can be in the form of raw data, i.e. data that are corrected only for bias and pixel variations, or any of a variety of well-known formats such as TIFF (Tagged Image Format File), JPEG (Joint Photographic Experts Group format), BMP (bitmap format), and the like. Alternatively, camera 805 can deliver raw data to computer 810 and computer 810 can optionally convert the raw data into one of the above formats for use in the operations described below. A monitor 815 connected to computer 810 by a conduit 813 displays images received and processed by computer 810. Computer 810 is preferably a personal computer that has all the usual features associated with such a device, including well-known RAM, ROM, and hard disk memories and optionally includes one or more memory types such as flash, optical, or magnetic memory.

Control unit 400 receives instructions from computer 810 via a conduit 814 and varies the focal length of lens 300 by actuating it through conduit 410. The information supplied by control unit 400 to lens 300 via conduit 410 can take any form suitable for adjusting the focal length of lens 300, such as fluid pressure, electrical signals, heat, signals conveyed by fiber optics, and the like.

PREFERRED EMBODIMENT

Figure 9:
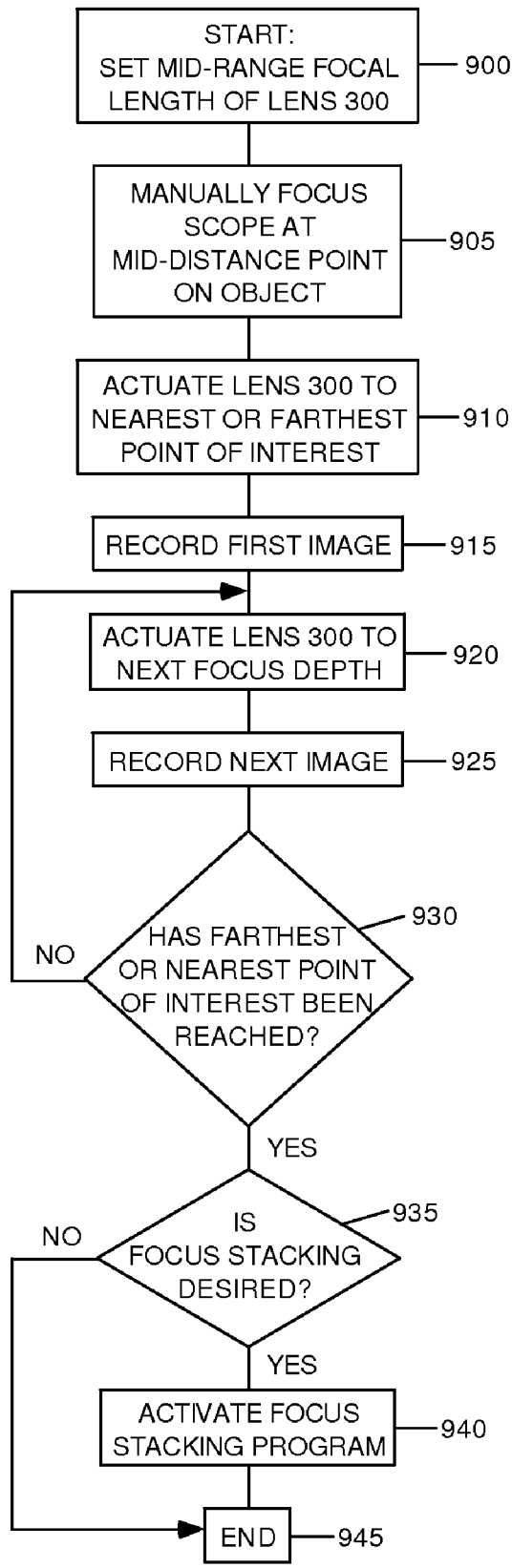
FIGS. 9 and 10 are flow diagrams showing two aspects of operation of the preferred embodiment.
Figure 10:
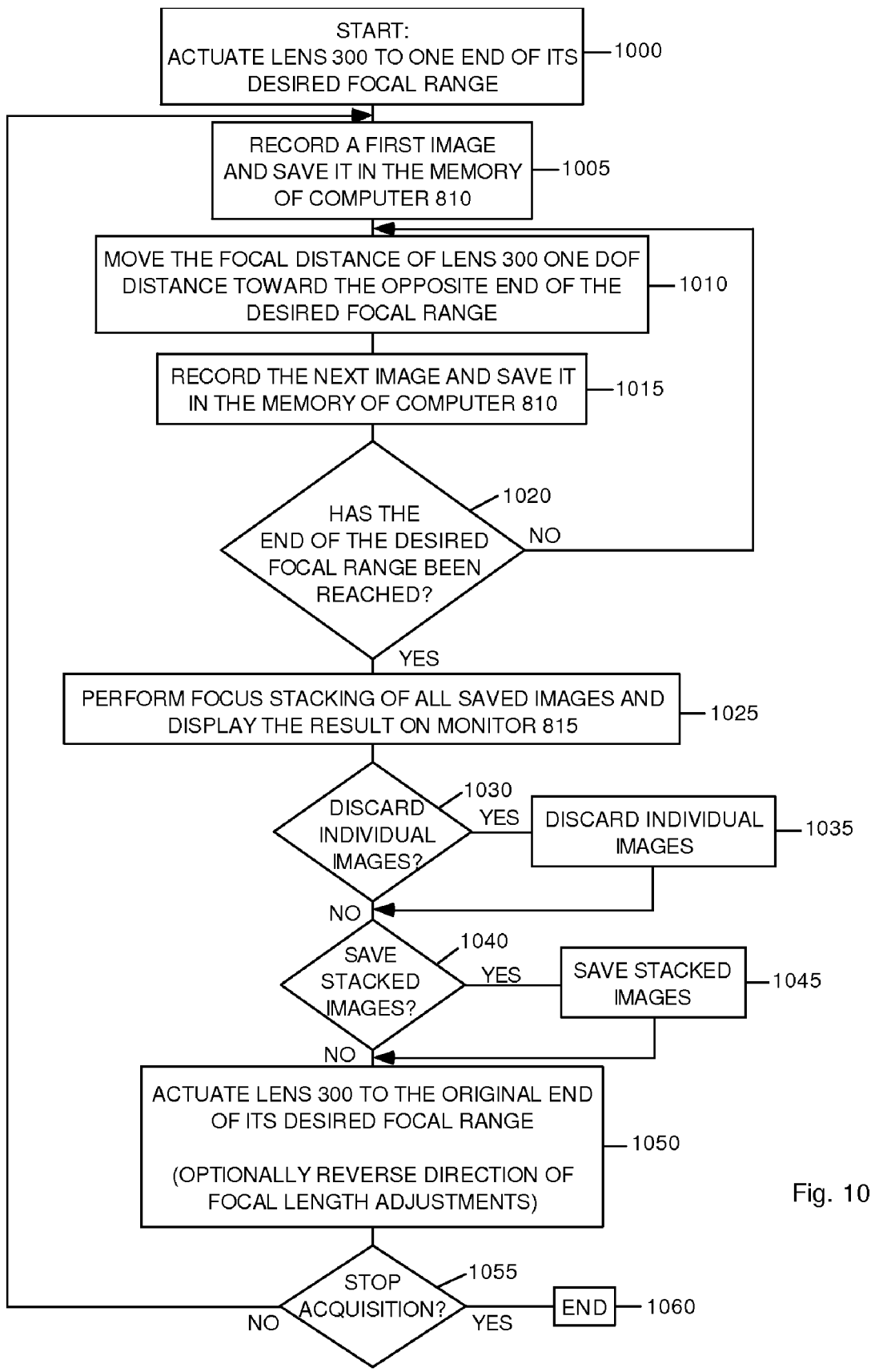

Operation—FIGS. 9 and 10

We presently contemplate several modes of operation of the system in FIG. 8. These include prior-art operation of scope 800 without focus stacking, one-at-a-time image collection optionally followed by focus stacking, and continuous automated focus stacking and display. RL 100 is presumed to be installed in either an eyepiece port or a trinocular port. The object being studied is illuminated in an appropriate manner. The image obtained by scope 800 is preferably viewed on monitor 815. Computer 810 acts under the control of a computer program that is written to accomplish all the steps described below.

Operation without Focus Stacking

Lens 300 is either left in a not-energized condition or energized to a fixed focal length. In either case, the focal length of lens 300 remains generally fixed as scope 800 is used. Focusing is done by energizing lens 300 to a selected, fixed focal length, or as in the prior art by varying the distance between the objective lens and the object being studied.

Operation with Focus Stacking—One-at-a-Time Image Collection—FIG. 9

FIG. 9 is a flow chart showing the steps used in one-at-a-time image collection by the system of FIG. 8. Lens 300 is actuated to a focal length near the middle of its adjustable range, step 900. Scope 800 is then manually focused on a part of the object that is roughly halfway between the nearest and farthest points desired for focus stacking, step 905. Lens 300 is then actuated to focus scope 800 at either the nearest or the farthest desired point of interest for focus stacking, step 910. A first image is recorded and saved in the memory or hard disk of computer 810, step 915. Lens 300 is then actuated to the next focus depth, step 920. If the progression of focus depths is started at the farthest point, focus is moved toward the nearest point, and vice-versa. The size of the focal step between successive images is equal to or less than the depth of field (DOF) of the lens system of the scope.

The next image is recorded, step 925. If the opposite extreme of the desired focal distance range has not been reached, step 930, control returns to step 920. The next focal depth is then set and another image is recorded, step 925.

If the opposite extreme of the desired focal distance range has been reached, step 930, the scope user can decide whether focus stacking of the acquired images is desired, step 935. If not, the process is at an end, step 945. If so, a focus stacking program in computer 810, or another computer, is activated and used to combine the recorded images (steps 915 and 925) for a resulting image that is fully-focused.

Continuous Automated Focus Stacking and Display—FIG. 10

FIG. 10 shows a flow chart for continuous automated focus stacking and display of the image using the system shown in FIG. 8. For this mode of operation, it is presumed that the DOF of the scope system, including lens 300, is known a-priori. The DOF can be calculated as discussed in our co-pending application Ser. No. 12/748,412. Alternatively, the DOF can be determined by experiment using the following steps or their equivalent: (1) set the focal length of lens 300 to a predetermined value; (2) manually adjust the scope so that an image on monitor 815 is in focus; (3) adjust the focal distance of lens 300 so that the image just begins to lose focus; (4) note the difference between the first and second focal distance settings of lens 300. The difference is approximately equal to the DOF.

For this mode of operation, the image on monitor 815 must be updated periodically. If a slow rate of updating, on the order of one second or so, is acceptable then a relatively fast personal computer can be used for this embodiment. If a fast rate of updating, on the order of tens of Hz, is required then computer 810 may require digital signal processing (DSP) capability and possibly graphics acceleration. These are well known to those skilled in the art of computer design and use. In addition, lens 300 will have to be able to focus at a rate commensurate with the rapid taking of images and camera 805 will have to be able to gather images and transfer them to computer 810 at a similar rate. These issues are discussed fully in our above-mentioned, co-pending patent application.

In this mode of operation, lens 300 continually sweeps through its range of focal distances as images are recorded at each DOF increment. After each sweep through the focal distance range, all images recorded with the present sweep are focus-stacked and the stacked result is shown on monitor 815 (FIG. 8). Monitor 815 is refreshed with a newly-stacked image after each stacking operation. If the rate of stacked-image output is sufficiently high, greater than or equal to about 24 frames per second, then the image on monitor 815 will appear to be continually updated. Lesser frame rates are useful, too. Updating the image at a slower rate, say once per second, still permits the operator to see each image with the full DOF of the combined stack of images. A slower frame rate can be done with less computing speed which can mean lower equipment cost. The images on monitor 815 will have a DOF equal to the combined DOF of all the images in a stack. The full range of focal distance is entered into computer 810 and steps 1000 through 1060 ensue.

FIG. 10 shows one possible sequence of operations for this mode of operation that comprises the following steps. At the start, step 1000, lens 300 is actuated to one end of its desired focal range. A first image is recorded and saved in the memory of computer 810, step 1005. The focal distance of lens 300 is incremented by one DOF in the direction toward the opposite end of its desired focal range, step 1010. The next image is then recorded in the memory of computer 810, step 1015. Computer 810 then checks to see if the end of the desired focal range has been reached, step 1020. If not, control reverts to step 1010 and another image is recorded, step 1015. If the end of the desired focal range has been reached, all the saved images are stacked by the focus-stacking program, combined into a final stacked image, and the result is displayed on monitor 815, step 1025.

If chosen, a previously selected option causes computer 810 to save or discard all individual images, step 1030. In step 1035, all individual images used to form the present stack are discarded. If chosen, another previously selected option causes computer 810 to save or discard all stacked images, step 1040. In step 1045, all stacked images are saved, preferably to the hard drive of computer 810.

Next, lens 300 is actuated to the original end of its desired focal range as was done in step 1000, step 1050. Optionally, instead of returning from the final end to the beginning end of its focal range, the DOF increments of lens 300 can simply be reversed.

At any time, the operator can stop acquisition in this mode by entering a command on computer 810, step 1055. If this is done, the acquisition and display of stacked images is at an end, step 1060. The most recent stacked image can remain on monitor 815, if desired. If acquisition is to continue, control returns to step 1010, and the process of recording and stacking continues. Stacked images that are saved can be easily combined into a video, if desired.

ALTERNATIVE EMBODIMENT

Figure 11:
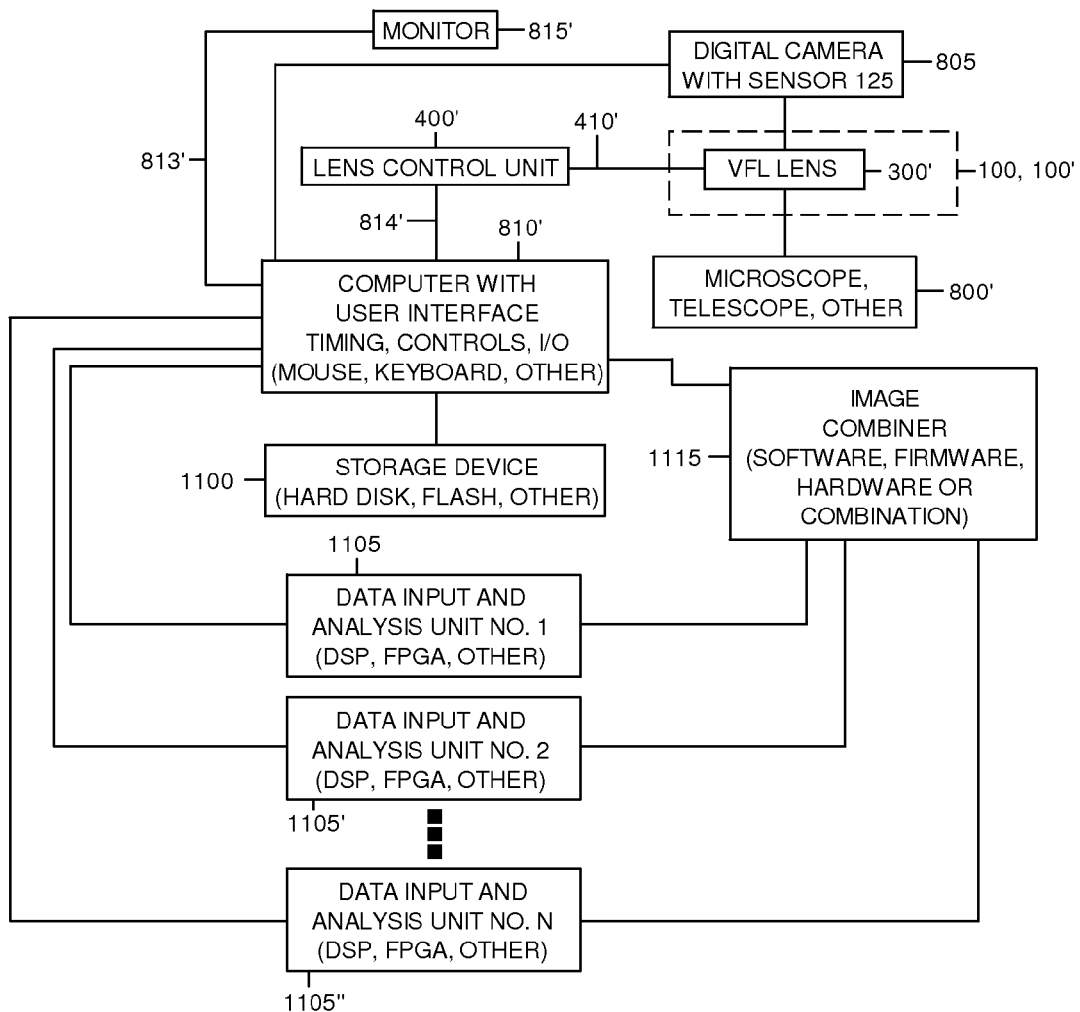
FIGS. 11 and 12 show block diagrams of an alternative embodiment.
Figure 12:
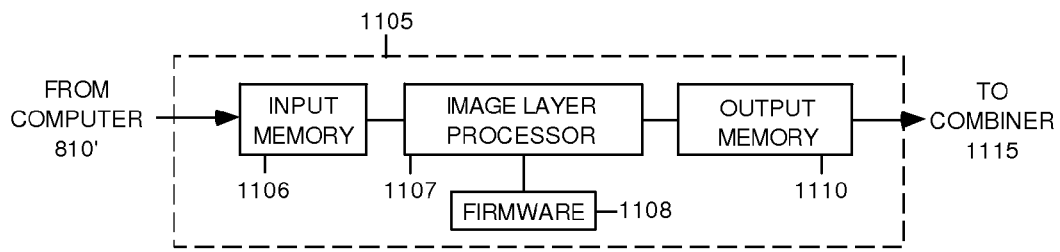
Figure 13:
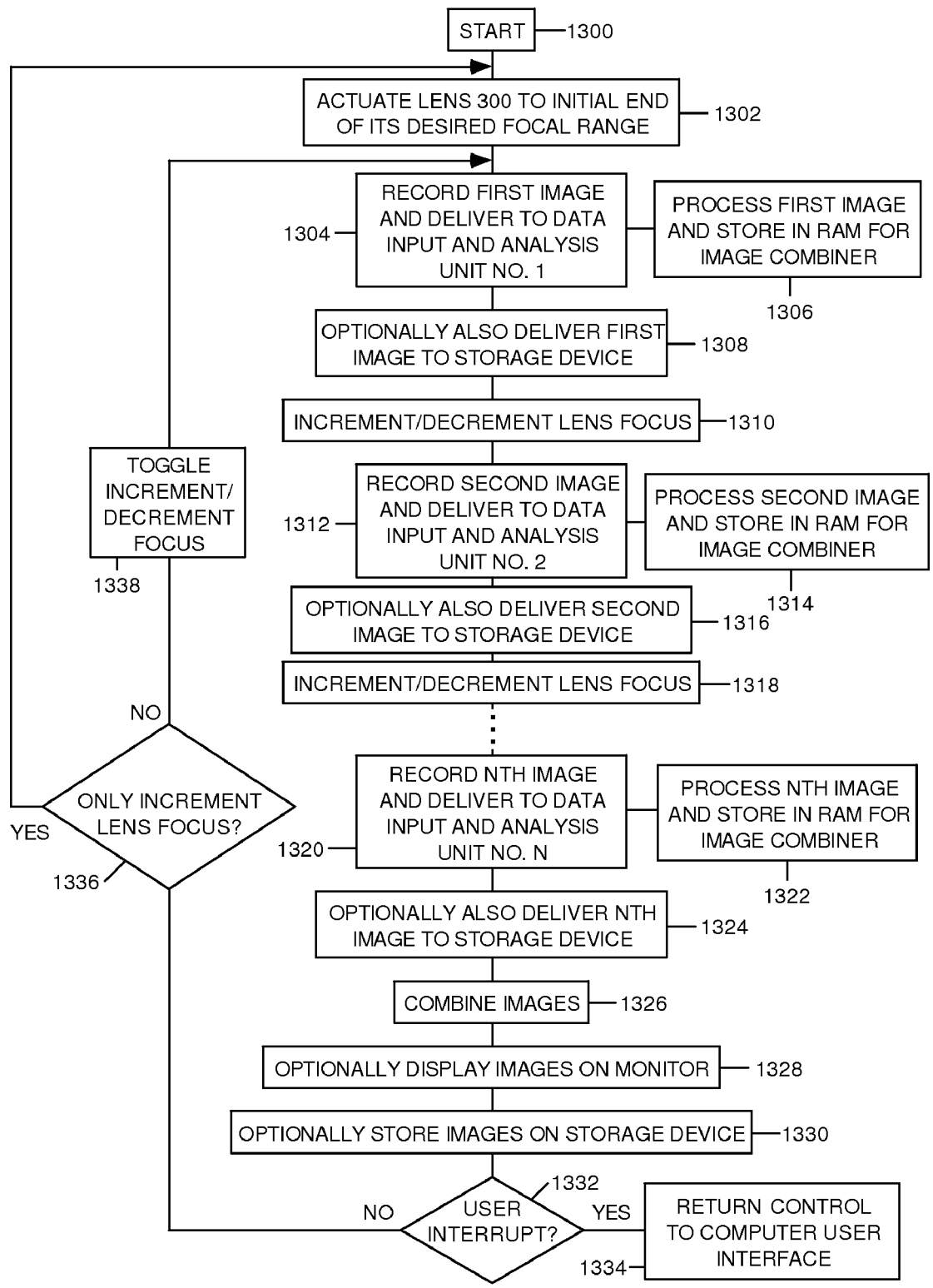
FIG. 13 is a flow diagram showing one aspect of operation of the embodiment shown in FIGS. 11 and 12.

Description and Operation—FIGS. 11 through 13

FIGS. 11 through 13 show apparatus and its operation according to one aspect of an alternative embodiment.

FIG. 11 shows an alternative arrangement in which images obtained using camera 805 and lens 300, either alone or in conjunction with RL100 or RL 100', can be delivered to an output storage device and monitor at relatively high speeds. Instead of obtaining and processing a stack of images as taught in connection with FIGS. 8 through 10, the present embodiment incorporates additional electronics to speed the process. A plurality of data input and analysis units 1105 each have the capability of receiving an image from sensor 125, processing the image for the purpose of focus-stacking, and storing the resultant image layer for later assembly into a stack. These units comprise one or more DSP devices, Field Programmable Gate Arrays (FPGA), other customizable computing devices, custom integrated circuits, or a combination of these that operate, at least in part, under local program instructions contained within each unit. When an image has been processed within unit 1105, the processed image is temporarily stored in output memory 1110 (FIG. 12) that is accessible by unit 1105 and an image combiner 1115. Memory 1110 is any kind of fast computer memory, typically Random Access Memory (RAM).

As with the embodiment described in connection with FIG. 8, the present embodiment can operate with raw, TIFF, JPEG, BMP and other file formats.

Combiner 1115 comprises an arrangement of software, firmware, and hardware that can combine the processed image information from all layers into a stacked image and deliver it to computer 810'. As the focal length of lens 300 changes, so does the magnification of the image that is focused on sensor 125. Thus combiner 1115 can also properly equalize the scale of images delivered by units 1105. In addition, combiner 1115 can perform any required iterative image and mathematical processing that includes more than one layer in a stack of images.

A series of programs operating within computer 810' synchronizes the operation and activation of all connected components, i.e. camera 805, monitor 815', lens control unit 400', a storage device 1100, units 1105, and combiner 1115.

FIG. 12 shows one aspect of the inner workings of blocks 1105. Each of blocks 1105 comprises at least an input memory 1106, an image layer processor 1107, firmware 1108, and an output memory 1110 that stores the processed image layer for use by the combiner 1115. Images obtained from camera 805 are delivered via computer 810' to an input memory 1106 of unit 1105. When an image is complete in memory 1106, image layer processor 1107 begins processing the present layer according to a predetermined focus stacking image analysis algorithm. Instructions comprising the image analysis algorithm are embodied in firmware 1108 in well-known fashion. When processing of the image is complete, the image is stored in memory 1110 for delivery to an input of combiner 1115.

FIG. 13 is a flow chart showing operation of the system in FIG. 11 according to two aspects of the present embodiment. In this embodiment, the user (not shown) has at least entered the number of images to be stacked, N, into computer 810' and indicated which of the two aspects of lens operation, described below, is desired. In a first aspect, the lens is cycled from an initial focus at one end of the desired focal range to the other end, incrementing one DOF with each step until the final focal distance is reached and all the images in the stack are delivered to the computer for displaying and saving; then focus is returned to the starting point and the process repeats for a new stack.

In a second aspect, the lens starts at an initial focus and the focus is incremented one DOF for each image until the final focal depth is reached and all the images in this first focal sequence are stacked and delivered to the computer for displaying and saving; then the focus is decremented one DOF per focal step until the initial focus is reached and all the images in the focal range are stacked and delivered to the computer for displaying and saving; then the focus is incremented again for a third stack, and so forth.

At the start, block 1300, software operating in computer 810' has been instructed by a user (not shown) to take a series of stacked images. The software initializes all variables, clears all memory if required, and then actuates lens 300 to the initial end of its desired focal range, step 1302. A first image is recorded by camera 805 and passed by computer 810' to data input and analysis unit number 1 (FIG. 11, unit 1105), step 1304. Unit 1105 immediately begins analyzing the image for the purpose of focus stacking and stores the result of the analysis in storage unit 1110, step 1306. The first image can also be stored in storage device 1100 (FIG. 11), if desired.

Next the focus of lens 300' is incremented by one DOF distance, step 1310. A second image is recorded by camera 805 and passed by computer 810' to data input and analysis unit number 2 (FIG. 11, unit 1105'), step 1312. Unit 1105' immediately begins analyzing the second image and stores the result in storage unit 1110', step 1314. Again, the second image can also be stored in storage device 1100, if desired. The focus of lens 300' is again incremented by one DOF distance, step 1318. This process continues until the last DOF increment has been reached, i.e. steps 1320, 1322, and 1324.

Next, computer 810' instructs combiner 1115 to combine all the images in the present stack into a single image, step 1326. This combined image is the result of the focus stacking process. The combined images are optionally displayed on monitor 815' and optionally stored in storage device 1100 as a single frame.

Next, computer 810' checks to see if the user wishes to interrupt the stacking process, step 1332. This is done in well-known fashion by clicking a mouse on an icon, pressing a key on the computer keyboard, etc. If there has been an interrupt, computer 810' returns control to its user interface and awaits further instructions. If there is no interrupt, computer 810' checks to see which aspect of lens operation has been selected by the user, step 1336. If the user selected the increment-only mode of lens operation, control returns to step 1302, lens 300 is reset to the original end of its desired focus range, and the above process repeats. Image memory storage units 1110 can optionally be erased before continuing, or the image data can simply be overwritten.

If the user selected the increment-decrement mode of lens operation, the focus distance is decremented and control returns to step 1304. In this pass around the loop from step 1304 to 1336, the lens focus distance is decremented at steps 1310 and 1318 so that the focus depth returns to the initial value.

Step 1338 is arranged to instruct computer 810' to toggle between incrementing and decrementing the focus of lens 300' after each stack. I.e., if the focal distance of lens 300' was incremented for each picture in a first stack, it will be decremented for each picture in a second stack, then incremented in the next stack and so forth. In this way, the focus of lens 300' always moves in small steps, instead of a series of small steps during acquisition of a stack of pictures and one large step between one stack and the next. The increment/decrement focusing mode can save time to get to the next focal distance and also decrease wear on the lens.

Figure 14:
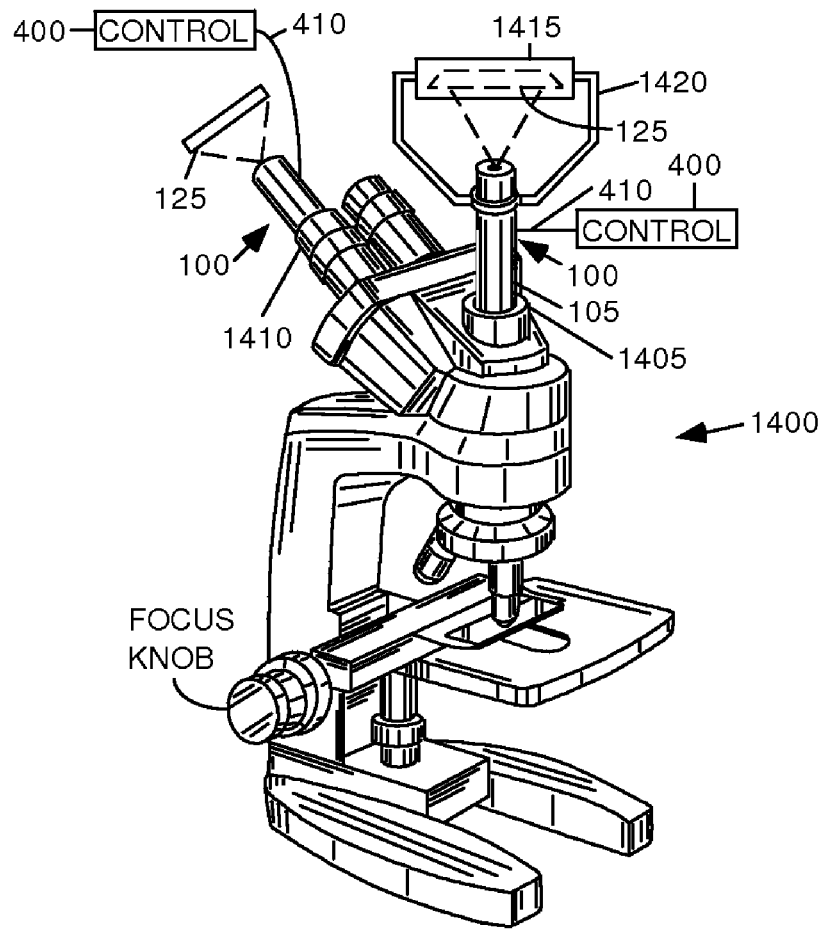
FIG. 14 shows a preferred embodiment mounted in a microscope.
Figure 15:
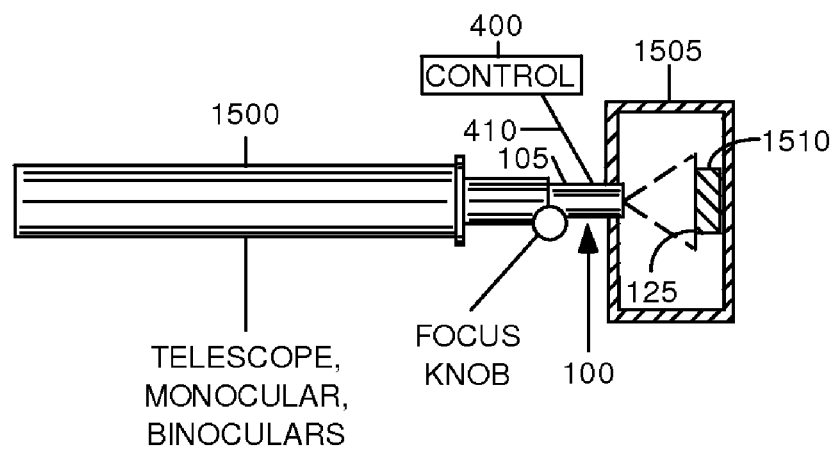
FIG. 15 shows a preferred embodiment mounted in a telescope.

Mountings for Preferred and Alternative Embodiments—FIGS. 14 and 15

FIGS. 14 and 15 show mountings that couple sensor 125 to RL 100. FIG. 14 shows a perspective view of a microscope generally at 1400. Microscope 1400 has a trinocular port 1405 and an eyepiece port 1410 in which relay lens 100, with control 400 and conduit 410, is shown mounted and ready for use on ports 1405 and 1410. In practice, relay lens 100 would be mounted in only one of ports 1405 and 1410. Dashed lines between lens 100 and sensor 125 indicate image information being projected by lens 100 onto sensor 125. A housing 1415, such as a camera body, securely holds sensor 125 and a bracket and clamping arrangement 1420 secures housing 1415 to tube 105 of RL 100. During operation, ambient light is excluded from housing 1415. This is accomplished by operating the microscope in a darkened environment or by securing a curtain (not shown) around the region between RL 100 and housing 1415.

FIG. 15 shows a side view of a telescope 1500 with RL 100 mounted in place of the eyepiece of the telescope. The same mounting can be used with a monocular or binocular. A housing 1505, such as a camera body, that contains sensor 125 is preferably coupled to tube 105 of lens assembly 100 with a light-tight seal. Sensor 125 is secured to housing 1505 by mounting means 1510 in order to position sensor 125 to properly receive image information from lens assembly 100. Control 400 and conduit 410 are connected to lens 300, as described above. Sensor 125 is shown in position to receive image information being projected by lens 100 onto sensor 125. As mentioned above, structures for mounting lens 100 and providing shielding from ambient light are used, but are omitted from this figure for clarity.

SUMMARY, RAMIFICATIONS, AND SCOPE

Thus it is seen that we have provided improved methods and apparatuses for focusing images viewed through microscopes, binoculars, and telescopes by providing serial focus stacking. While the above description contains many specificities, these should not be considered limiting but merely exemplary. Many variations and ramifications are possible. For example, instead of a single camera and relay lens arrangement, extended DOF stereoscopic images can be produced by placing a camera and relay arrangement in each of the two eyepieces on a stereoscopic scope. Light of any suitable wavelength or intensity can be used, provided the wavelengths are suitable for use with the optical materials in the relay lens and the image sensor. Instead of an open-loop control for the lens, closed-loop feedback can be employed. Dark field, light field, fluorescence, differential interference contrast, and all other illumination and imaging techniques that require focus are contemplated. In some instances, the methods and apparatus taught herein can be applied to confocal microscopes and borescopes. Instead of presenting all parts of a field of view in focus, images from selected depths within a stack can be included in a stack and thus be in focus while others are not included in the stack and are out of focus. Instead of starting a stack at one end of the focal range or the other, the stack can be started at an intermediate point in the focal range. Instead of using an image layer processor and memory for storing each image in a stack, an image layer processor can have more than one output memory so that the processor can be used to process more than one image in a stack, thereby saving hardware expense. An actuator can be added to the focus knob of a scope and placed under control of the computer in the above embodiments in order to provide well-known auto-focus capability to locate one or both ends of a focal range that will be used in focus stacking.

While the present system employs elements that are well-known to those skilled in the arts of optical design and computer software and hardware design, it combines these elements in a novel way which produces new results not heretofore discovered. Accordingly the scope of this invention should be determined, not by the embodiments illustrated, but by the appended claims and their legal equivalents.

The invention claimed is:

1. A relay lens assembly for relaying images from an objective lens to an image sensor in a wide-field imaging system, comprising:
   a focusing lens element having a remotely actuable, selectable focal length,
   wherein the selectable focal lengths are spaced so that the depth of field of each selectable focal length overlap,
   means for holding said lens element in a position between said objective lens and said image sensor in said wide-field imaging system,
   a control unit,
   and a conduit operationally connecting said lens element and said control unit,
   said control unit being capable of receiving actuating commands and remotely changing said focal length of said lens element via said conduit in response to said commands,
   whereby when said control unit receives an actuating command for said lens element said command is passed to said lens element via said conduit, thereby actuating said lens element and selecting said focal length of said lens element.

2. The relay lens assembly of claim 1 wherein said control unit is arranged to accept commands from a computer and provide actuating driving forces for said lens element selected from the group consisting of electrical, mechanical, fluidic, thermal, and optical driving forces.

3. The relay lens assembly of claim 1 wherein a driving force selected from the group consisting of electrical, mechanical, fluidic, thermal, and optical driving forces acts through said conduit to change said focal length of said relay lens assembly.

4. The relay lens assembly of claim 1 wherein said means for holding said lens element is selected from the group consisting of lens tubes and brackets.

5. The relay lens assembly of claim 1, wherein said relay lens assembly is configured for use with devices selected from the group consisting of microscopes, telescopes, monoculars, and binoculars.

6. A method for relaying a plurality of images from an objective lens to an image sensor in a wide-field imaging system in preparation for focus stacking, comprising:
   providing a relay lens assembly having a focusing lens element with a range of remotely actuable, selectable focal lengths,
   wherein the selectable focal lengths are spaced so that the depth of field of each selectable focal length overlap,
   inserting said relay lens assembly between said objective lens and said image sensor in said wide-field imaging system,
   providing a control unit capable of causing said lens element to assume a plurality of selectable, predetermined focal lengths, said control unit being responsive to commands issued by a computing device,
   providing a computing device capable of issuing said commands to said control unit, providing a first conduit between said computing device and said control unit, providing a second conduit between said control unit and said lens, wherein said first and said second conduits are arranged to urge said lens to assume said plurality of focal lengths in response to said commands, providing means for holding said lens element in a position interposed between said objective lens and said image sensor, causing said image from said objective lens to enter said relay lens assembly, causing said computing device to issue a first of said commands to said control unit for selecting a first of said plurality of focal lengths, thereby causing said lens element to assume said first of said plurality of focal lengths, whereupon said sensor can be activated by said computing device in order to record said image at said first of said focal lengths, causing said computing device to issue a second of said commands to said control unit for selecting a second of said plurality of focal lengths, thereby causing said lens element to assume said second of said plurality of focal lengths, whereupon said sensor can be activated by said computing device in order to record said second image at said second of said focal lengths, whereby said computing device can cause said lens element to assume said first and said second focal lengths for relaying said first and second images to said sensor for recordation by said sensor and said computing device.

7. The method of claim 6 wherein said lens element is actuable by driving forces selected from the group consisting of electrical, mechanical, fluidic, thermal, and optical driving forces.

8. The method of claim 6 wherein said means for holding said lens element is selected from the group consisting of lens tubes and brackets.

9. The method of claim 6, further including:
providing a plurality of data analysis units, wherein each of said units receives one of said recorded images of the said first or second focal lengths, processes said image, and stores the processed image, providing a combiner arranged to receive said processed and stored images from said plurality of data analysis units, causing said computing device to issue a command to said combiner that causes said combiner to combine said processed images into a stack, whereupon said stack can be received by said computing device for recordation and display, whereby in combination said relay lens assembly, said control unit, said computing device, said plurality of data analysis units, and said combiner can automate and speed the process of focus stacking.

10. The method of claim 6, wherein said relay lens assembly is configured for use with devices selected from the group consisting of microscopes, telescopes, monoculars, and binoculars.

11. A system for performing focus stacking photomontage of a plurality of images obtained through an objective lens in a wide-field imaging system and received by an image sensor, comprising:
a relay lens assembly comprising:
(a) a focusing lens element having a range of remotely actuable, selectable focal lengths,
wherein the selectable focal lengths are spaced so that the depth of field of each selectable focal length overlap, (b) a control unit coupled to said lens by a conduit and capable of causing said lens element to assume any of said focal lengths in said range when so instructed by a computer, and (c) a computer running software that is capable of communicating instructions to said control unit, said computer also having computing, displaying, and storage capability for computing, displaying, and storing said photomontage, said relay lens assembly being interposed between said objective lens and said image sensor, and wherein said computer synchronizes the operation of said image sensor and said relay lens assembly so as to produce a stack of images that can be subsequently compiled into said photomontage.

12. The system of claim 11, further including a plurality of data analysis units and a combiner, said data analysis units and said combiner operating under control of said software in said computer, wherein each of said data analysis units is arranged to receive, process, and store at least one of said images in said plurality of images comprising said stack of images, and wherein said individual processed images are combined by said combiner, and after said combining said combined images are delivered to said computer for recordation and display.

13. The system of claim 12 wherein each of said data analysis units comprises an input memory, an image layer processor, an output memory, and firmware.

14. The system of claim 13 wherein said image layer processor is selected from the group consisting of digital signal processors, field programmable gate arrays, customizable computing devices, and custom integrated circuits.

15. The system of claim 11, further including means selected from the group consisting of lens tubes and brackets for securing said relay lens between said objective lens and said image sensor.

16. The system of claim 11, wherein said lens element is actuable by driving forces selected from the group consisting of electrical, mechanical, fluidic, thermal, and optical driving forces.

17. The system of claim 11, wherein the format of said images is selected from the group consisting of raw, TIFF, JPEG, and BMP formats.

18. A method for relaying an image from an objective lens to an image sensor in a wide-field imaging system, comprising:
providing a remotely actuable relay lens assembly having a focusing lens element capable of assuming a plurality of predetermined, selectable focal lengths, wherein the selectable focal lengths are spaced so that the depth of field of each selectable focal length overlap, providing a control unit capable of causing said lens element to assume at least one of said predetermined selectable focal lengths, said control unit being responsive to commands issued by a computing device, providing a computing device capable of issuing commands to said control unit and computing and displaying said image, providing a first conduit between said computing device and said control unit, providing a second conduit between said control unit and said lens, said second conduit being arranged to urge said lens to assume any of said plurality of focal lengths in response to said commands from said computing device, providing means for holding said lens element in a position interposed between said objective lens and said image sensor in said wide-field imaging system, causing said image from said objective lens to enter said relay lens assembly and be relayed to said image sensor, causing said computing device to issue a command to said control unit for selecting said focal length, whereupon said sensor can be urged to record said image at said selected focal length, whereby said computing device can cause said lens element to assume said focal length for relaying said image to said sensor for recordation by said sensor and said computing device.

19. The method of claim 18 wherein said means for holding said lens element are selected from the group consisting of lens tubes and brackets.

20. The method of claim 18, wherein said relay lens assembly is configured for use with devices selected from the group consisting of microscopes, telescopes, monoculars, and binoculars.

* * * * *